(12) United States Patent
Maloney

(10) Patent No.: US 9,710,779 B1
(45) Date of Patent: Jul. 18, 2017

(54) SYSTEM, METHOD AND APPARATUS FOR RECEIVING BIDS FROM DINERS FOR EXPEDITED FOOD DELIVERY

(71) Applicant: GRUBHUB HOLDINGS, INC., Chicago, IL (US)

(72) Inventor: Matthew Maloney, Chicago, IL (US)

(73) Assignee: GrubHub Holdings, Inc., Chicago, IL (US)

( * ) Notice: Subject to any disclaimer, the term of this patent is extended or adjusted under 35 U.S.C. 154(b) by 8 days.

(21) Appl. No.: 13/622,837

(22) Filed: Sep. 19, 2012

Related U.S. Application Data

(63) Continuation-in-part of application No. 13/622,659, filed on Sep. 19, 2012, and a continuation-in-part of application No. 13/612,243, filed on Sep. 12, 2012, now abandoned, which is a continuation-in-part of application No. 13/337,362, filed on Dec. 27, 2011, now abandoned.

(60) Provisional application No. 61/640,439, filed on Apr. 30, 2012.

(51) Int. Cl.
*G06Q 10/08* (2012.01)
*G06Q 30/00* (2012.01)

(52) U.S. Cl.
CPC ..... *G06Q 10/0833* (2013.01); *G06Q 10/0834* (2013.01); *G06Q 10/0835* (2013.01); *G06Q 10/08355* (2013.01); *G06Q 30/016* (2013.01)

(58) Field of Classification Search
CPC combination set(s) only.
See application file for complete search history.

(56) References Cited

U.S. PATENT DOCUMENTS

| | | | |
|---|---|---|---|
| 4,530,067 A | 7/1985 | Dorr | |
| 4,547,851 A | 10/1985 | Kurland | |
| 5,189,411 A | 2/1993 | Collar | |
| 5,272,474 A | 12/1993 | Hilliard | |
| 5,367,557 A | 11/1994 | Ozenbaugh | |
| 5,510,979 A | 4/1996 | Moderi | |
| 5,570,283 A | 10/1996 | Shoolery | |
| 5,648,770 A * | 7/1997 | Ross | 340/994 |
| 5,745,681 A | 4/1998 | Levine | |
| 5,751,958 A | 5/1998 | Zweben | |

(Continued)

FOREIGN PATENT DOCUMENTS

| | | |
|---|---|---|
| EP | 0 844 579 A2 | 5/1998 |
| EP | 0 856 812 A2 | 5/1998 |

(Continued)

OTHER PUBLICATIONS

Define: "delivery" as "The giving up or handing over". See Random House Dictionary (2013) (attached).*

(Continued)

*Primary Examiner* — Peter L Ludwig
(74) *Attorney, Agent, or Firm* — Hickman Palermo Becker Bingham LLP

(57) ABSTRACT

An order server operated by a restaurant service communicates with a restaurant server and a driver to retrieve incentive based food preparation and delivery time frames for an order. Using the time frames, the order server formulate a list of incentive based delivery plans, and provides the list to a diner device. From the diner device, the order server receives a selected incentive based delivery plan for the order from the list.

25 Claims, 11 Drawing Sheets

(56) References Cited

U.S. PATENT DOCUMENTS

| | | | |
|---|---|---|---|
| 5,774,670 A | 6/1998 | Montulli | |
| 5,781,189 A | 7/1998 | Holleran | |
| 5,835,896 A | 11/1998 | Fisher | |
| 5,838,798 A | 11/1998 | Stevens | |
| 5,839,115 A | 11/1998 | Coleman | |
| 5,842,176 A | 11/1998 | Hunt | |
| 5,845,263 A | 12/1998 | Camaisa | |
| 5,850,214 A | 12/1998 | McNally | |
| 5,912,743 A | 6/1999 | Kinebuchi | |
| 5,948,040 A | 9/1999 | DeLorme | |
| 5,966,068 A | 10/1999 | Wicks | |
| 5,970,474 A | 10/1999 | LeRoy | |
| 5,991,739 A | 11/1999 | Cupps | |
| 6,134,548 A | 10/2000 | Gottsman | |
| 6,167,255 A | 12/2000 | Kennedy | |
| 6,175,922 B1 | 1/2001 | Wang | |
| 6,208,976 B1 | 3/2001 | Kinebuchi | |
| 6,236,974 B1 | 5/2001 | Kolawa | |
| 6,282,491 B1 | 8/2001 | Bochmann | |
| 6,295,541 B1 | 9/2001 | Bodnar | |
| 6,300,947 B1 | 10/2001 | Kanevsky | |
| 6,341,268 B2 | 1/2002 | Walker | |
| 6,356,543 B2 | 3/2002 | Hall | |
| 6,366,650 B1 | 4/2002 | Rhie | |
| 6,415,138 B2 | 7/2002 | Sirola | |
| 6,590,588 B2 | 7/2003 | Lincke | |
| 6,594,347 B1 | 7/2003 | Calder | |
| 6,836,537 B1 | 12/2004 | Zirngibl | |
| 6,873,693 B1 | 3/2005 | Langseth | |
| 6,973,437 B1 | 12/2005 | Olewicz | |
| 7,069,228 B1 | 6/2006 | Rose | |
| 7,216,152 B2 | 5/2007 | Short | |
| 7,359,871 B1 | 4/2008 | Paasche | |
| 7,386,477 B2 | 6/2008 | Fano | |
| 7,437,305 B1* | 10/2008 | Kantarjiev et al. | 705/7.22 |
| 7,693,964 B2* | 4/2010 | Hancock et al. | 709/219 |
| 7,966,215 B1 | 6/2011 | Myers | |
| 7,987,107 B2* | 7/2011 | Wilson et al. | 705/7.12 |
| 8,073,723 B1* | 12/2011 | Bilibin et al. | 705/7.13 |
| 8,326,705 B2* | 12/2012 | Niessen et al. | 705/28 |
| 8,341,003 B1* | 12/2012 | Bilibin et al. | 705/7.13 |
| 8,407,110 B1* | 3/2013 | Joseph et al. | 705/28 |
| 8,554,579 B2* | 10/2013 | Tribble et al. | 705/3 |
| 8,560,399 B2* | 10/2013 | Compton et al. | 705/26.64 |
| 2001/0047301 A1 | 11/2001 | Walker | |
| 2002/0005430 A1 | 1/2002 | Pentel | |
| 2002/0046093 A1 | 4/2002 | Miller | |
| 2002/0107747 A1 | 8/2002 | Gerogianni | |
| 2002/0143645 A1 | 10/2002 | Odinak et al. | |
| 2002/0143655 A1 | 10/2002 | Elston | |
| 2002/0165908 A1* | 11/2002 | Lala et al. | 709/203 |
| 2002/0178034 A1 | 11/2002 | Gardner | |
| 2002/0188492 A1* | 12/2002 | Borton | 705/8 |
| 2004/0210621 A1* | 10/2004 | Antonellis | 709/200 |
| 2005/0004843 A1 | 1/2005 | Heflin | |
| 2005/0049940 A1 | 3/2005 | Tengler | |
| 2006/0059023 A1* | 3/2006 | Mashinsky | 705/5 |
| 2006/0080176 A1 | 4/2006 | Sutcliffe | |
| 2006/0122851 A1* | 6/2006 | Ryan, Jr. | 705/1 |
| 2006/0178943 A1* | 8/2006 | Rollinson et al. | 705/26 |
| 2007/0011061 A1* | 1/2007 | East | 705/28 |
| 2007/0150375 A1 | 6/2007 | Yang | |
| 2007/0294129 A1* | 12/2007 | Froseth et al. | 705/10 |
| 2008/0076451 A1 | 3/2008 | Sheha et al. | |
| 2008/0104059 A1 | 5/2008 | Segel | |
| 2009/0048890 A1* | 2/2009 | Burgh | 705/8 |
| 2009/0150193 A1 | 6/2009 | Hong | |
| 2009/0167553 A1* | 7/2009 | Hong et al. | 340/825.29 |
| 2009/0204492 A1 | 8/2009 | Scifo et al. | |
| 2009/0307096 A1 | 12/2009 | Antonellis | |
| 2010/0070376 A1 | 3/2010 | Proud et al. | |
| 2010/0076853 A1 | 3/2010 | Schwarz | |
| 2010/0088175 A1* | 4/2010 | Lundquist | 705/14.34 |
| 2010/0161432 A1* | 6/2010 | Kumanov et al. | 705/15 |
| 2011/0040642 A1 | 2/2011 | O'Dell | |
| 2011/0093363 A1* | 4/2011 | Blatstein | 705/27.1 |
| 2011/0173041 A1* | 7/2011 | Breitenbach et al. | 705/7.13 |
| 2011/0191194 A1 | 8/2011 | Lutnick et al. | |
| 2011/0208617 A1 | 8/2011 | Weiland | |
| 2011/0258011 A1 | 10/2011 | Burns | |
| 2011/0258058 A1* | 10/2011 | Carroll et al. | 705/15 |
| 2011/0270662 A1* | 11/2011 | Rocco | 705/14.27 |
| 2012/0036028 A1* | 2/2012 | Webb | 705/15 |
| 2012/0173350 A1* | 7/2012 | Robson | 705/16 |
| 2012/0203619 A1* | 8/2012 | Lutnick et al. | 705/14.35 |
| 2012/0290413 A1* | 11/2012 | Harman | 705/15 |
| 2013/0024299 A1* | 1/2013 | Wong et al. | 705/15 |
| 2013/0027227 A1* | 1/2013 | Nordstrom | 340/990 |
| 2013/0038800 A1* | 2/2013 | Yoo | 348/734 |
| 2013/0103605 A1* | 4/2013 | Villegas | 705/332 |
| 2013/0144730 A1 | 6/2013 | Harman | |
| 2013/0144764 A1* | 6/2013 | Walling, III | 705/27.1 |

FOREIGN PATENT DOCUMENTS

| | | |
|---|---|---|
| EP | 1 081 625 A2 | 7/2001 |
| JP | 62-050919 | 3/1987 |
| JP | 5-40767 | 2/1993 |
| JP | 6-52195 | 2/1994 |
| JP | 6-203051 | 7/1994 |
| JP | 9-160972 | 6/1997 |
| JP | 9-204466 | 8/1997 |
| JP | 9-296819 | 11/1997 |
| JP | 9-325988 | 12/1997 |
| JP | 9-330470 | 12/1997 |
| JP | 10-011194 | 1/1998 |
| JP | 10-224549 | 8/1998 |
| JP | 11-126147 | 5/1999 |
| JP | 11-191035 | 7/1999 |
| JP | 11-202974 | 7/1999 |
| WO | WO 95/34040 A1 | 12/1995 |
| WO | WO 97/08635 A1 | 3/1997 |
| WO | WO 98/35311 A1 | 8/1998 |
| WO | WO 99/17236 A1 | 4/1999 |

OTHER PUBLICATIONS

Definition of Server (archived back to Dec. 24, 2007), www.businessdictionary.com/definition/server.html.*

Definition of Server (May 16, 2005), The Linux Information Project.*

U.S. Appl. No. 11/839,751, filed Feb. 19, 2009, Stuart Burgh.

U.S. Appl. No. 60/131,119, filed Apr. 27, 1999, Robert Showghi.

U.S. Appl. No. 60/083,651, filed Apr. 30, 1998, Theodore Chen.

Kevin Crowston, Understanding Processes in Organizations, Jul. 1998.

Engaging Customers Across All Touch Points: A Roadmap for Leading Retailers, Blue Martini Software, Inc., www.bluemartini.com.

Chuck Andraka, Put your database on the Web, Data Based Advisor, v14, n6, p. 12, Jun. 1996.

Steven Vaughan-Nichols, Unleashing Databases on the Web—True wealth and power belong to those who control information access, Netguide, 1996, n307, p. 111.

P.L. Olympia, Cold Fusion 1.5; Autobahn, DBMS, v9, n8, p. 33, Jul. 1996.

eshop.com, eShop eShop Technology, eshop.com, Jan. 1, 1996.

eshop.com, eShip Technology Merchant Manual, eShop.com, Feb. 21, 1996.

Kambe Tomonari, Screen design simulator "U-face", Information Processing Society of Japan (IPSJ) The 39th National convention colleciton of papers, 1457-1458, Oct. 16, 1989.

Kato Kiyosh, A Prototype of a User Interface Software for Portable Terminal with a Small Display Screen, Information Processing Society of Japan (IPSJ) The 53rd National co . . . .

Squirrel Systems, May 8, 1999, http://web.archive.org/web/19990508153731/www.squirrelsystems.com/about/company.

Robin Berger, POS Positions Spago for Growth, Squirrel Systems, Apr./May 1997.

(56) References Cited

OTHER PUBLICATIONS

Squirrel Systems, POS System, May 8, 1999, http://web.archive.org/web/19990508175824/www.squirrelsystems.com/products/newsq . . . .
Squirrel Systems, Squirrel Restaurant Management System.
Squirrel Systems, Press Releases, Squirrel Systems, Aug. 20, 1998.
Business Editors, Fujitsu and Sulcus Hospitality Group partner to develop first wireless computer for restaurant industry, Business Wire, Aug. 30, 1993.
Sulcus's Squirrel and cybermeals Ink Technology Alliance, Business Wire, Feb. 24, 1998.
Accel Partners Invest $10 Million incybermeals, Business Wire, May 28, 1998.
Rev Share Information, Cybermeals, Jan. 24, 1998.
Squirrel point-of-sale software, Squirrel Systems, Oct. 10, 1999.
Chapter 4—Wireless Data, Wireless Technologies and the. National Information Infrastructure, Diane Pub Co, Oct. 1995.
About Us, Compuwave Technologies Inc., Feb. 7, 2001.
Wireless Products, Compuwave Technologies Inc., Feb. 7, 2001.
Micros Systems, Inc., POS Configurator User's Guide, 3700 POS, Micros Systems, Inc., 1998.
Micros Systems, Inc., New Products, Micros Systems, Inc., Nov. 11, 1996.
Rita Marie Emmer, Marketing Hotels: Using Global Distribution System, Cornell Hotel and Restaurant Administration Quarterly, 1993, 34; 80; DOI: 10.1177/001088049303400614.
T. Imielinski, Adaptive Wireless Information Systems, 1994.
IBM, POS Computer, 1998.
Krishna Bharat, Migratory Applications.
Andrew Fano, Shopper's Eye: Using Lcoation-based filtering for a shopping agent in the physical world, 1998.
Len Lewis, Opening the gates, Progressive Grover, Jul. 1998.
Arthur Keller, The Diana approach to mobile computing, CiteSeer, 1995.
A Chavez, A real-life experiment in creating an agent marketplace, PAAM, 1997.
Richard De Santa, Are you into your customers?, Supermarket Business, Jan. 1997.
Barron Housel, VVebExpress: a system for optimizing web browsing in a wireless environment.
Carrie Lehman, Service connects restaurants, customers via orders by Internet, Alaska Journal of Commerce, Apr. 28, 1997.
Jennifer Rowley, Internet food retailing: the UK in context, ProQuest LLC, 1998.
John Soeder, Cyber Solicitation, Restaurant Hospitality, Sep. 1997.
Brew Moon Management Toasts Squirrel's "Seamless Solution", Squirrel Systems, Nov. 1998.
Squirrel Systems, Squirrel® Customer Profile: Chevys Fresh Mex®, Squirrel Systems—Restaurant Management, Aug. 1998.
Micro Systems, Inc., Appendix, User's Manual, 8700 HMS Version 2.10, micros Systems, Inc., 1995-1997.
Micro Systems, Inc., Chapter 1-11, User's Manual, 8700 HMS Version 2.10, micros Systems, Inc., 1995-1997.
Micro Systems, Inc., Full Service Operations, Micros 3700 Point-of-Sale System, Micro Systems, Inc., Nov. 11, 1996.
Micro Systems, Inc., New Products, Micros 3700 Point-of-Sale System, Micro Systems, Inc., Nov. 11, 1996.
Micro Systems, Inc., Quick Service Operations, Micro Systems, Inc., Nov. 11, 1996.
Micro Systems, Inc., All About Us, Micro Systems, Inc., Nov. 11, 1996.
Micro Systems, Inc., Full Service Operations, Micro Systems, Inc., Nov. 11, 1996.
Micro Systems, Inc., 8700 HMS Product Overview, Micro Systems, Inc., 2000.
Micro Systems, Inc., Micros Hand-Held TouchScreen, Micro Systems, Inc., Sep., 1992.
Micro Systems, Inc., The Micro 2700 HMS Touchscreen, Micro Systems, Inc.
RMS Touch, RMS-Touch—Touch Screen Restaurant Management System Product Description, RMSTouch.com, Feb. 15, 1997.
RMS Touch, Company Profile RMS, Touch.com, Integrated Restaurant Software, Feb. 15, 1997.
Elite32 Restaurant System, Compuwave Technologies Inc., 2000.
POS Infrared Restaurant System, Compuwave Technologies Inc., 2000.
Wireless POS Drive-Through System, Compuwave Technologies Inc., 2000.
Compuware Technologies Approved as Supplier to McDonald's Canda, Compuwave Technologies Inc., Sep. 14, 2000.
Wireless Restaurant System, Compuwave Technologies Inc., Feb. 7, 2001.
Webpage, http://web.archive.org/web/201 012041 00846/http://www.grubhub.com/, GrubHub, Inc., Oct. 29, 2010.
U.S. Appl. No. 13/622,659, filed Sep. 19, 2012, Final Office Action, Feb. 5, 2016.

* cited by examiner

SYSTEM, METHOD AND APPARATUS FOR RECEIVING BIDS FROM DINERS FOR EXPEDITED FOOD DELIVERY

CROSS REFERENCE TO RELATED APPLICATIONS

This application claims the benefit and priority as a continuation-in-part of application Ser. No. 13/622,659, filed Sep. 19, 2012, which claims the benefit of provisional application 61/640,439, filed Apr. 30, 2012, the entire contents of which is hereby incorporated by reference for all purposes as if fully set forth herein. This application also claims the benefit as a continuation-in-part of application Ser. No. 13/612,243, filed Sep. 12, 2012, which claims the benefit as a continuation-in-part of application Ser. No. 13/337,362, the entire contents of which is hereby incorporated by reference for all purposes as if fully set forth herein. Furthermore, this application is related to a application Ser. No. 13/622,868, filed Sep. 19, 2012, the entire contents of which is hereby incorporated by reference for all purposes as if fully set forth herein.

FIELD OF THE DISCLOSURE

The present invention relates to a system, method and apparatus for managing incentive based delivery of made-to-order food, and more particularly relates to a system, method and apparatus utilizing software applications operating on a delivery driver mobile device, a diner device, an on-site service appliance, a restaurant server, a driver server, and an order server respectively to efficiently deliver made-to-order food to diners based on one or more incentive plans offered to diners.

DESCRIPTION OF BACKGROUND

Delivery of made-to-order food is typically accomplished by delivery drivers (driving automobiles or riding bicycles) hired by a restaurant or delivery service. A delivery driver may deliver made-to-order food for multiple restaurants, while a restaurant may use multiple delivery drivers. The delivery time of an order is affected by a number of factors, such as the time that the serving restaurant of the order takes to prepare the order. Restaurants generally try to prepare food as soon as they can to satisfy their diners. A restaurant usually prepares its orders based on the reception time, from the first to the last, of the orders. However, neither the restaurant nor a restaurant service including the restaurant provides a way for a diner to selectively expedite the preparation of her order.

The delivery time of the order is also affected by the time between when the order is ready for delivery and when a delivery driver takes the order on a delivery trip. This time is determined by how fast the restaurant or delivery service finds a delivery driver for the order. Oftentimes, a restaurant uses certain delivery drivers. When none of the delivery drivers are immediately available to deliver the order, the restaurant is forced to wait until one of the delivery drivers becomes available to deliver the order. In particular, neither the restaurant nor delivery service can typically find a delivery driver who can deliver the order and deliver it within a certain time frame, if all of the restaurant's or delivery service's usual drivers are handling other orders.

Furthermore, the delivery time of the order is affected by the number of orders assigned to particular delivery trip, as well as the order in which a delivery driver delivers the orders. Delivery drivers generally follow delivery routes and deliver orders in predetermined orders or sequences, such as delivering the order with the address closest to the driver's restaurant or base first, or delivering an order designated by a restaurant manager as "important" first. However, diners sometimes desire to have their orders delivered earlier than a time dictated by the delivery route and sequence. The conventional delivery method does not provide an efficient way for diners to reduce the delivery time of her order.

OBJECTS OF THE DISCLOSED SYSTEM AND METHOD

An object of the disclosed made-to-order food delivery management system is to provide efficient delivery of made-to-order food;

Another object of the disclosed made-to-order food delivery management system is to allow a diner to expedite delivery of an order based on an incentive plan;

Another object of the disclosed made-to-order food delivery management system is to provide an incentive to a restaurant for expediting preparation of an order;

Another object of the disclosed made-to-order food delivery management system is to ensure timely delivery of made-to-order food;

Another object of the disclosed made-to-order food delivery management system is to maximize revenue for restaurants;

Another object of the disclosed made-to-order food delivery management system is to maximize revenue for a restaurant service;

Other advantages of the disclosed made-to-order food delivery management system will be clear to a person of ordinary skill in the art. It should be understood, however, that a system, method, or apparatus could practice the disclosed made-to-order food delivery management system while not achieving all of the enumerated advantages, and that the protected made-to-order food delivery management system is defined by the claims.

SUMMARY OF THE DISCLOSURE

By equipping delivery drivers with a wireless mobile device ("driver mobile device"), such as a smart phone or a tablet computer, that includes an application in communication with a driver server controlled by a restaurant service, a restaurant service can aid drivers in efficiently bidding for orders to deliver made-to-order food. In addition, the driver mobile device can aid in expediting deliveries, maximizing income, and providing prompt delivery statuses for diners. Furthermore, the driver mobile device application along with other server software applications assist the restaurant service in maximizing revenue for member restaurants, and providing incentive based deliveries for diners.

The driver server includes a driver server software application that is adapted to retrieve a list of orders for the driver mobile device and send the list to the mobile device. For example, the driver server application queries a database controlled by the restaurant service to retrieve the list of orders. The driver server software application is further adapted to receive a set of selected orders out of the list from the mobile device. Moreover, the driver server software application is adapted to assign one or more orders from the set of selected orders to the delivery driver in possession of the mobile device.

An order server of a restaurant service includes an order server software application to aid diners in efficiently bidding for expedited delivery of made-to-order food. The order server software application is adapted to retrieve incentive based food preparation time frames from a restaurant server and incentive based delivery time frames from a driver server for an order. Based on the time frames, the order server software application formulates incentive based delivery plans for the order, and communicates these plans to a diner software application running on a diner device. Alternatively, these plans are presented on a website and accessed using the diner device. Additionally, the order server software application is adapted to receive an indication of a selected incentive based delivery plan from the list of incentive based delivery plans.

The diner software application is adapted to request the list of incentive based delivery plans for the order from the order server software application over a wide area network, such as the Internet. Moreover, the diner software application displays the list of incentive based delivery plans for the diner to select one. Upon selection of one incentive based delivery plan for the order from the list, the diner software application communicates the selected plan to the order server software application. Additionally, the diner software application is adapted to receive order statuses for the order from the order server software application and/or other applications.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE ILLUSTRATED EMBODIMENT

Figure 1:
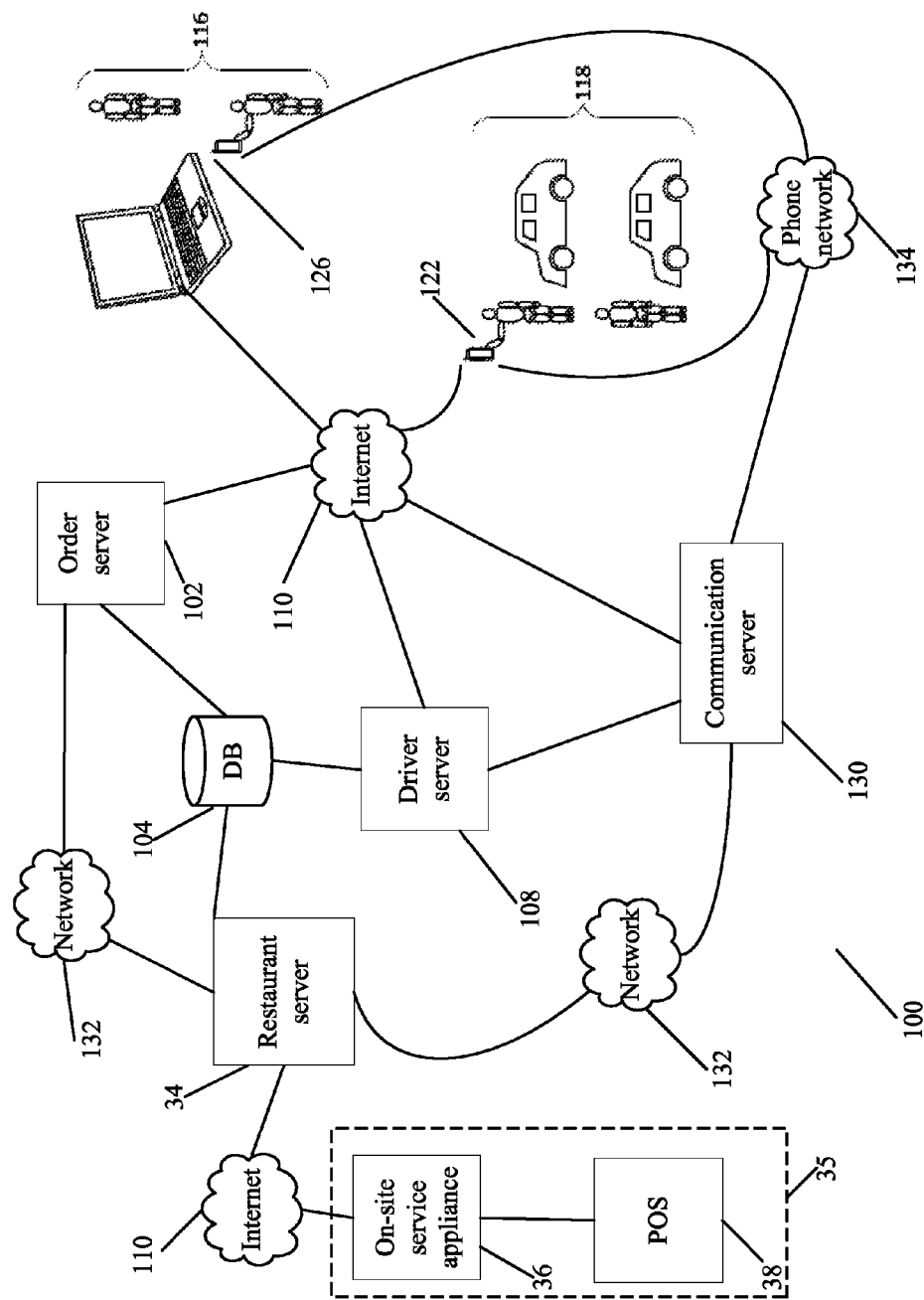
FIG. 1 is a simplified block diagram of a delivery management system constructed in accordance with this disclosure.

Turning to the Figures and to FIG. 1 in particular, an incentive based delivery management system 100 for a restaurant service is shown. The illustrated delivery management system 100 allows restaurants and delivery services to provide incentive based delivery of made-to-order food. Furthermore, the illustrated delivery management system 100 allows diners to use the supported delivery service(s) by, for example, bidding on earlier delivery of food.

An order server 102 collects orders from diners 116, who use diner devices 126, over a wide area network 110 such as the Internet. In one embodiment in accordance with the present teachings, the order server 102 includes a processor, a network interface, and some amount of memory. The orders are queued in a database 104, which also includes information regarding diners as well as restaurant menus, as more fully set forth in U.S. application Ser. No. 13/337,362, which was previously incorporated by reference. A restaurant server 34 processes queued orders and communicates those orders to member restaurants 35 via the Internet 110, a public telephone network (such as a phone network 134), or some other method. In one embodiment, the member restaurant 35 houses an on-site service appliance 36 and/or a point-of-sale system 38 ("POS"). The member restaurant 35 and a delivery service may receive the orders using the on-site service appliance 36. The member restaurant 35 then prepares the food, which is delivered by a delivery driver 118 to the corresponding diner.

The restaurant server 34 is coupled to a communication server 130 over a network 132 (such as an intranet or extranet). The communication server 130 is used to communicate with the diners 116 over the Internet 110 or a phone network 134. A driver server 108 communicates with a driver mobile device 122, which runs a driver mobile software application, over the Internet 110. Alternatively, the driver server 108 communicates with the driver mobile device 122 via the communication server 130, which is coupled to the Internet 110 and the phone network 134. In one embodiment, in accordance with the present teachings, the driver server 108 includes a processor, a network interface, and some amount of memory.

Additionally, the driver mobile device 122 (which can be one of the mobile devices pictured in FIG. 11) includes a housing that comprises a touchscreen, a display, a processor, a wireless network interface, and a memory. For example, the driver mobile device 122 is a smartphone, such as an iPhone device created by Apple Inc. As an additional example, the driver mobile device 122 is a tablet computer or a laptop computer. A delivery driver 118 uses the driver mobile device 122 to retrieve orders from the driver server 108 for delivery, as more fully set forth in U.S. application No. 61/640,439, which was previously incorporated by reference. Furthermore, the driver mobile device 122 can send order delivery statuses to the diner device 126 over the Internet 110 or the phone network 134.

Figure 11:
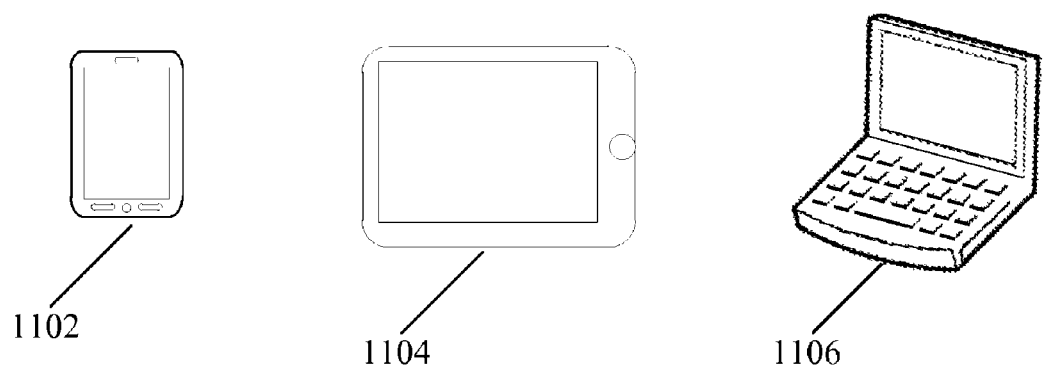
FIG. 11 is a depiction of various driver mobile devices that can be used by a delivery driver in accordance with the teachings of this disclosure.

In one embodiment of the disclosed delivery management system, when a diner software application running on the diner device 126 (which can be a desktop computer or one of the mobile devices pictured in FIG. 11) places an order, the order server 102 queries the restaurant server 34, which subsequently queries the on-site service appliance 36, for different incentive based food preparation time frames. In one implementation, the order server 102 communicates with the restaurant server 34 over the network 132. Furthermore, the order server 102 retrieves incentive based delivery time frames for the order from a database 104. Upon receiving the incentive based delivery plans from the order server 102, the diner software application displays the order along with the plans, and allows the diner 116 to select an incentive based delivery plan.

Figure 2:
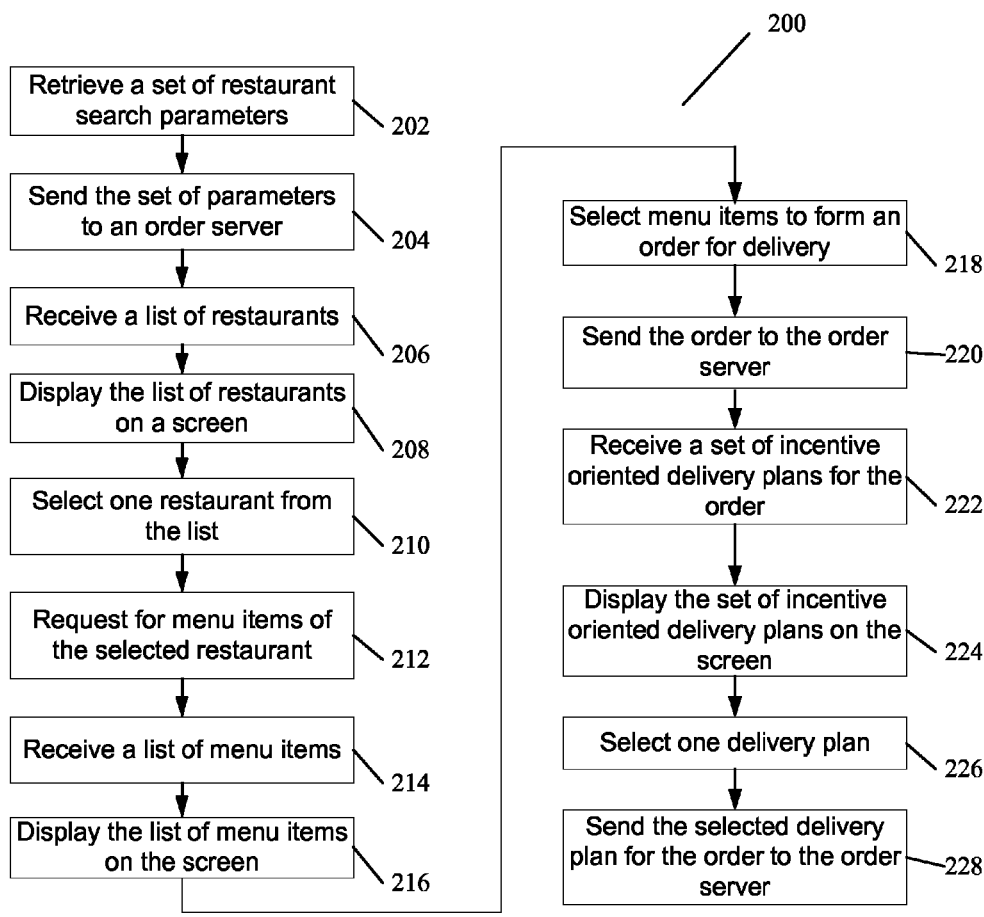
FIG. 2 is a flowchart depicting a process by which a diner software application places an order with incentive based delivery plans in accordance with the teachings of this disclosure.

When the diners 116 place orders using their diner devices 126, the diner software application running on the diner devices 126 performs a process 200, as illustrated by reference to FIG. 2. The diner software application can be a proprietary software application operating on a computer, such as, for example, a smartphone or tablet, or a browser displaying web pages. The diner software application provides a screen allowing the diner 116 to enter restaurant searching parameters. At 202, the diner software application retrieves a set of restaurant search parameters entered by the diner 116. At 204, the diner software application sends the parameters to the order server 102. Subsequently, at 206, the diner software application receives a list of restaurants from the order server 102. The diner software application then, at 208, displays the list of restaurants on a screen of the diner device 126. Responding to the diner 116's selection of a restaurant, at 210, the diner software application selects one restaurant from the list.

At 212, the diner software application sends a request to the order server 102 for menu items of the selected restaurant. Subsequently, at 214, the diner software application receives a list of menu items of the selected restaurants. In step 216, the diner software application displays the list of menu items on the screen of the diner device 126. The diner 116 chooses menu items and quantities of each selected menu item for her order. In response to the diner 116's order, at 218, the diner software application selects the chosen menu items and forms an order for delivery to the diner 116. At 220, the diner software application sends the order to the order server 102. Then, at 222, the diner software application receives, from the order server 102, a set of incentive based delivery plans for the order. The diner software application, at 224, displays the order and the incentive based delivery plans on the screen of the diner device 126. A sample screen of the order and the incentive based delivery plans is shown at 300, as illustrated by reference to FIG. 3.

Figure 3:
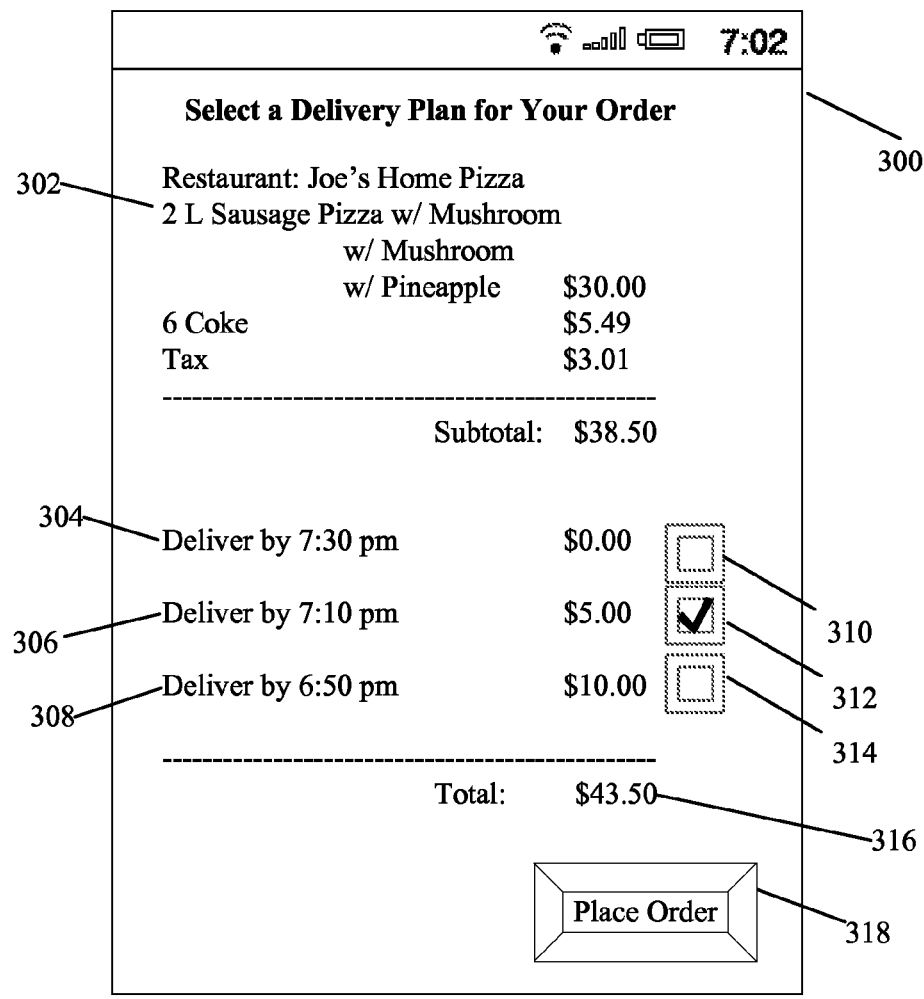
FIG. 3 is a screen from a driver mobile device software application displaying an order with incentive based delivery plans and constructed in accordance with the teachings of this disclosure.

Referring now to FIG. 3, the screen 300 includes some details 302 of the order. Additionally, the screen 300 includes three incentive based delivery plans 304, 306, 308. For example, the delivery plan 304 is a normal delivery plan, under which the order is delivered by 7:30 PM without additional charge to the diner 116. Under the plan 306, if the order is delivered by 7:10 PM, the diner 116 will be charged an extra five dollars for the earlier delivery. Similarly, under the plan 308, where the order is delivered by 6:50 PM, the diner 116 will be charged an extra ten dollars for the earlier delivery. For the delivery plans 304, 306, 308, the screen 300 provides three checkboxes 310, 312, 314 respectively. The checkboxes 310, 312, 314 allow the diner 116 to select one of the delivery plans 304, 306, 308. For example, where the diner 116 selects the delivery plan 306, the checkbox 312 is marked, and a total charge of $43.50, including the five dollar upcharge for the delivery plan 306, is indicated at 316.

A "Place Order" button 318 allows the diner 116 to place the order. Turning back to FIG. 2, at 226, the diner software application selects one delivery plan in response to a press of the "Place Order" button 318 by the diner 116. Furthermore, at 228, the diner software application sends the order along with the selected incentive based delivery plan to the order server 102.

Figure 4:
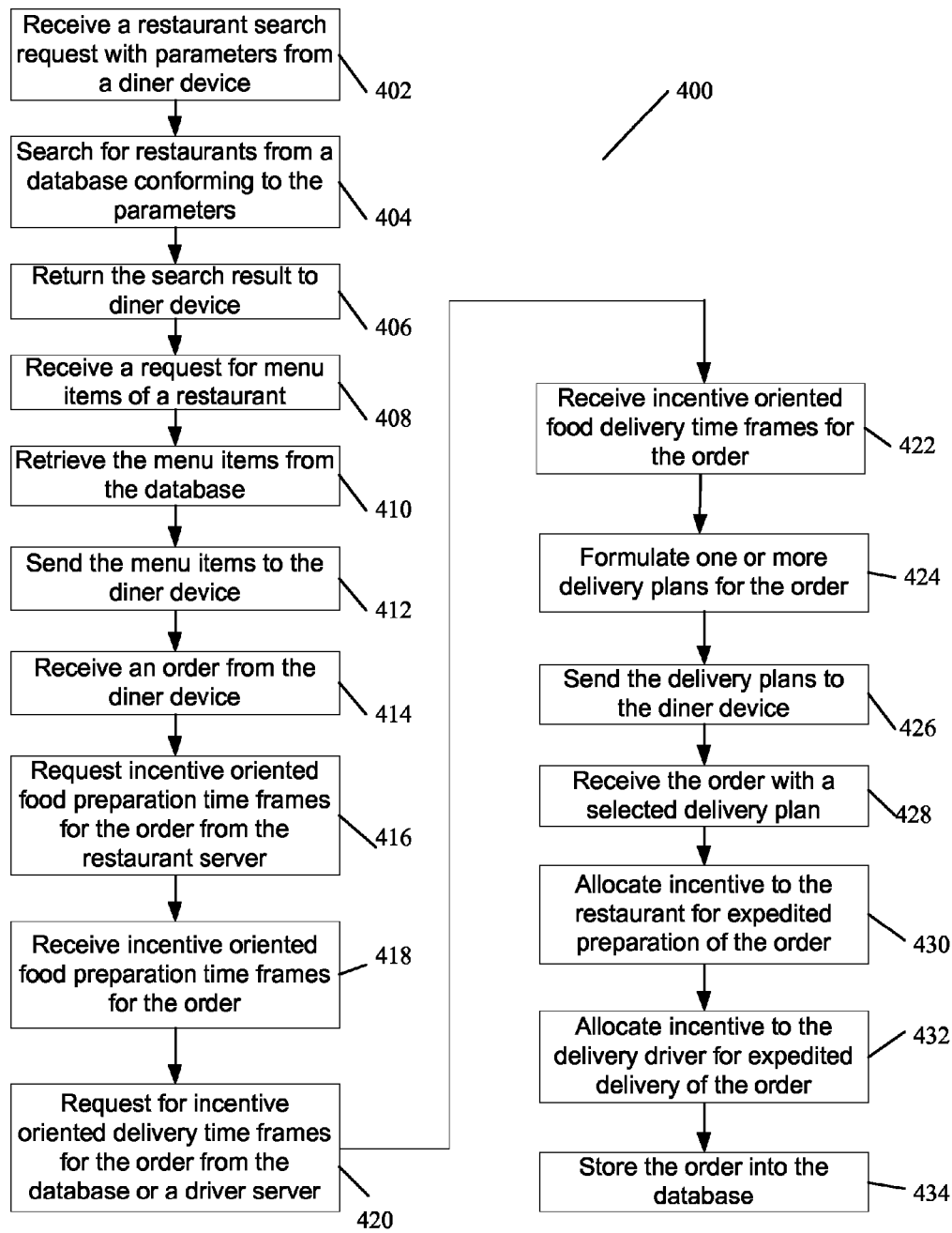
FIG. 4 is a flowchart depicting a process by which an order server software application accepts an order with incentive based delivery plans in accordance with the teachings of this disclosure.

To enable the diner software application to place an order, the order server 102 runs an order server software application, which performs a process 400, as illustrated by reference to FIG. 4, to handle order placement. Referring to FIG. 4, at 402, the order server software application receives a restaurant search request with parameters, which were sent at 204. At 404, based on the received restaurant search parameters, the order server software application searches for restaurants from the database 104. At 406, the order server software application sends the search result, i.e., a list of restaurants, to the diner device 126. At 408, the order server software application receives a request for menu items of a restaurant. At 410 and 412, the order server software application respectively retrieves the menu items for the restaurant from the database 104, and sends the menu items to the diner device 126.

At 414, the order server software application receives an order from the diner device 126. The order includes, but is not limited to, the restaurant, diner information (such as name, phone number, email address, address, etc.), order items, quantity for each order item, total charge, among others. At 416, the order server software application requests for incentive based food preparation time frames for the order from the restaurant server 34. In one implementation, the order server 102 sends the request directly to the restaurant server 34 over the network 132. Alternatively, the order server 102 sends the request to the restaurant server 34 via the database 104. At 418, the order server software application receives one or more incentive based food preparation time frames for the order.

For example, where the order is completely prepared for delivery by 7:30 PM, the serving restaurant makes no extra charges for the order. However, if the order is completely prepared for delivery by 7:10 PM, the serving restaurant will charge the diner for an extra five dollars. As an additional example, if the order is completely prepared for delivery by 6:50 PM, the serving restaurant will charge the diner for an extra ten dollars.

At 420, the order server software application requests for incentive based delivery time frames for the order from the database 104 or the driver server 108. At 422, the order server software application receives one or more incentive based delivery time frames for the order. At 424, the order server software application formulates one or more delivery plans for the order. For example, the serving restaurant makes the order ready for delivery by 7:30 PM without extra charge, by 7:10 PM with an extra charge of five dollars, and by 6:50 PM with an extra charge of ten dollars. Additionally, a delivery driver can deliver the order by 7:45 PM without extra delivery charge, by 7:25 PM with an extra charge of five dollars, and by 7:10 PM with an extra charge of eight dollars. In such a case, the order server software application can formulate a number of incentive delivery plans. Some example delivery plans are: delivering the order by 7:45 PM on without incurring extra charges on the diner, delivering the order by 7:25 PM incurs an extra charge of ten dollars on the diner, and delivering the order by 7:10 PM incurs an extra charge of eighteen dollars on the diner.

At 426, the order server software application sends the incentive based delivery plans for the order to the diner device 126. At 428, the order server software application receives the placed order with a selected delivery plan. At 430 and 432, the order server software application respectively allocates the extra charge associated with the selected delivery plan between the serving restaurant and the delivery driver. In a further implementation, the order server software application allocates a portion of the extra charge for other parties, such as a restaurant service hosting the delivery management system 100. It should be noted that, where the serving restaurant does not expedite the preparation of the order, the serving restaurant receives no incentive for an early delivery of the order. Similarly, where the delivery driver does not expedite the delivery of the order, the delivery driver receives no incentive for an early delivery of the order. Furthermore, where the serving restaurant and/or the delivery driver fail to expedite the order as agreed to, they may be charged a penalty. At 434, the order server software application stores the order along with the delivery plan into the database 104.

Figure 5:
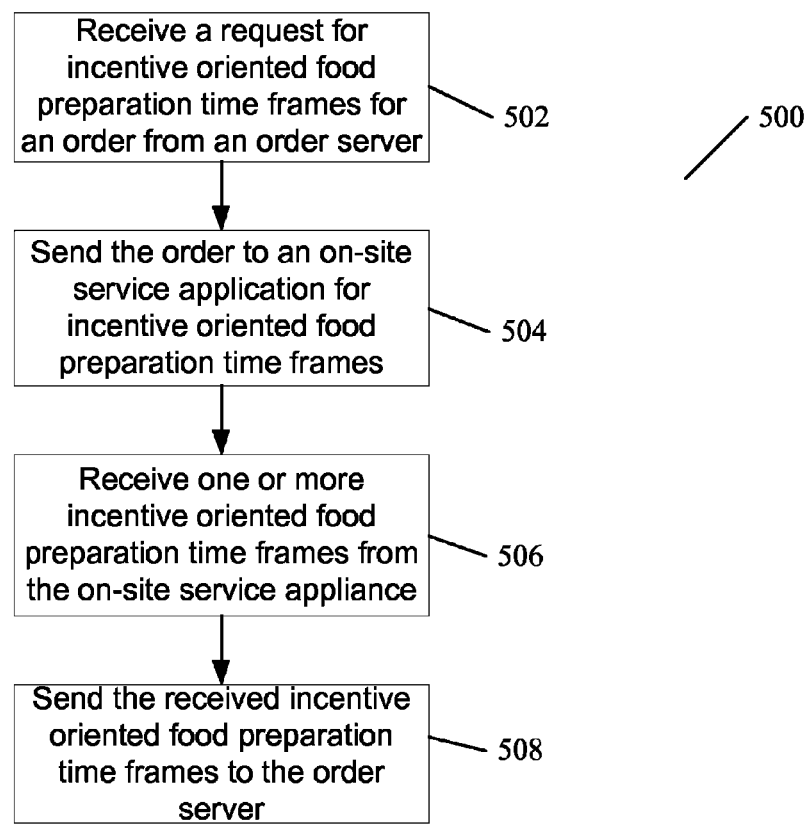
FIG. 5 is a flowchart depicting a process by which a restaurant server software application provides incentive based food preparation time by a restaurant in accordance with the teachings of this disclosure.

To provide incentive based food preparation time frames for an order, a restaurant server software application operating on the restaurant server 34 performs a process 500, as illustrated by reference to FIG. 5. Referring to FIG. 5, at 502, the restaurant server software application receives a request, sent at 416, for incentive based food preparation time frames for the order. At 504, the restaurant server software application sends the order to the on-site service appliance 36 over the Internet 110, and requests for incentive based food preparation time frames for the order. At 506, the restaurant server software application receives one or more incentive based food preparation time frames for the order. Thereafter, at 508, the restaurant server software application sends the received incentive based food preparation time frames to the order server 102.

Figure 6:
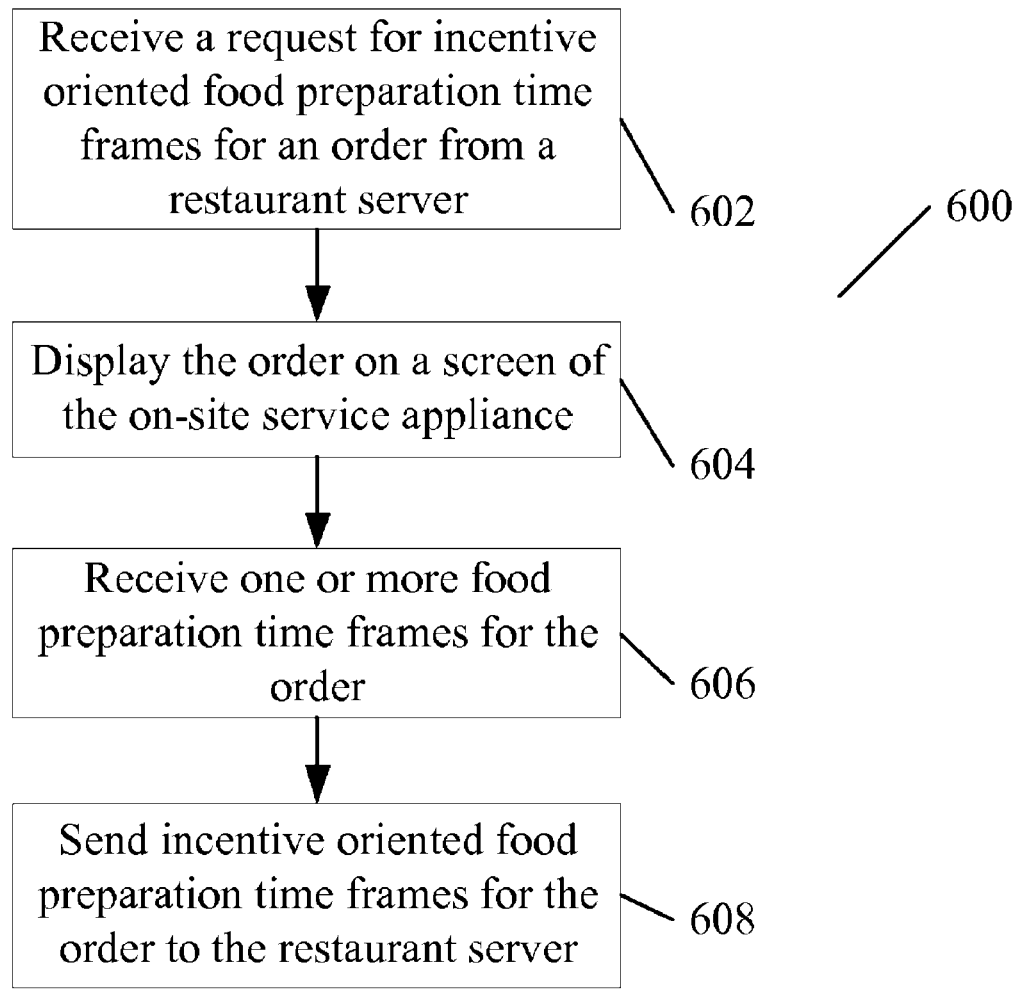
FIG. 6 is a flowchart depicting a process by which an on-site service appliance software application provides incentive based food preparation time from a restaurant in accordance with the teachings of this disclosure.
Figure 7:
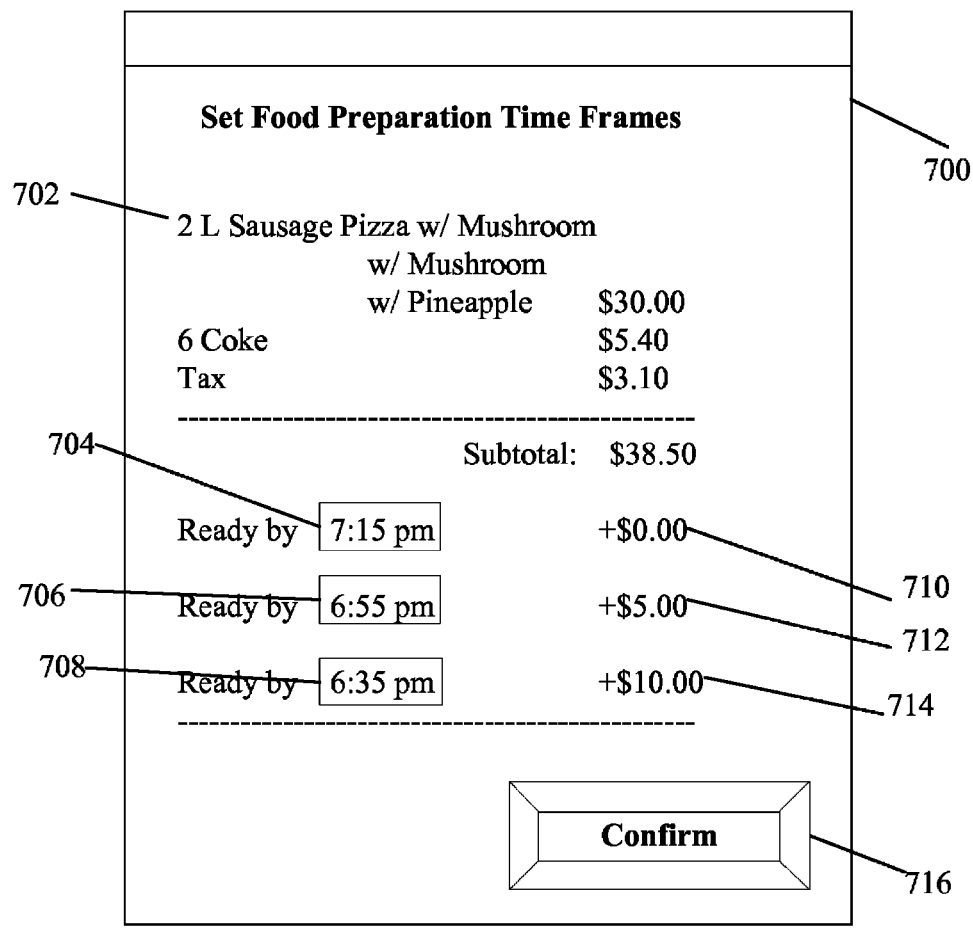
FIG. 7 is a screen from an on-site service appliance software application displaying an order with incentive based food preparation options and constructed in accordance with the teachings of this disclosure.

To provide incentive based food preparation time frames for an order, an on-site service appliance software application operating on the appliance 36 performs a process 600, as illustrated by reference to FIG. 6. Referring to FIG. 6, at 602, the appliance software application receives a request for incentive based food preparation time frames for the order, which was sent at 504. At 604, the appliance software application displays the order and the request for incentive based food preparation time frames on a screen of the appliance 36. A sample screen 700 of the order and request is illustrated by reference to FIG. 7. Turning to FIG. 7 for now, the screen 700 includes some order details 702, and different food preparation time frames 704-708 along with associated incentives 710-714 respectively. For example, if the serving restaurant 35 readies the order by 7:15 PM, it receives no extra incentive for preparing the order. However, if the serving restaurant 35 readies the order by 6:55 PM, it receives an extra five dollars for preparing the order. Additionally, if the serving restaurant 35 readies the order by 6:35 PM, it receives an extra ten dollars for preparing the order.

In one implementation, an employee of the serving restaurant can specify the different time frames 704, 706, 708. In a further implementation, the employee can specify the amount of incentives 710, 712, 714. Additionally, the employee can add and remove different time frames. When the employee is done with configuring different food preparation plans for the order, she presses a "Confirm" button 716 to respond to the request received at 602. Turning back to FIG. 6, in response to the pressing of the "Confirm" button 716 by the employee, at 606, the appliance software application receives one or more food preparation time frames for the order. At 608, the appliance software application sends the received one or more food preparation time frames for the order to the restaurant server 34.

Sometimes, incentive based delivery plans are not available for an order at the time the order is placed. For example, expedited preparation of food may not be available when the serving restaurant is overloaded with orders when the order is placed. As an additional example, expedited delivery plans may not be available when all delivery drivers associated with the serving restaurant of the order are delivering food at the time the order is placed. However, such options may become available for the order at a later time. For instance, when the order is out for delivery by the delivery driver 118 and the driver 118 has multiple orders to deliver, expedited delivery of the order can be made available to the diner 116, provided that the driver 118 will not be made late for delivery of other orders of her current delivery trip. The diner 116 can be alerted of the newly available incentive based delivery plans via a text message, an email, a push notification, a web page, or a proprietary message. In such a case, the process of expediting the delivery of the order is illustrated by reference to FIG. 8.

Figure 8:
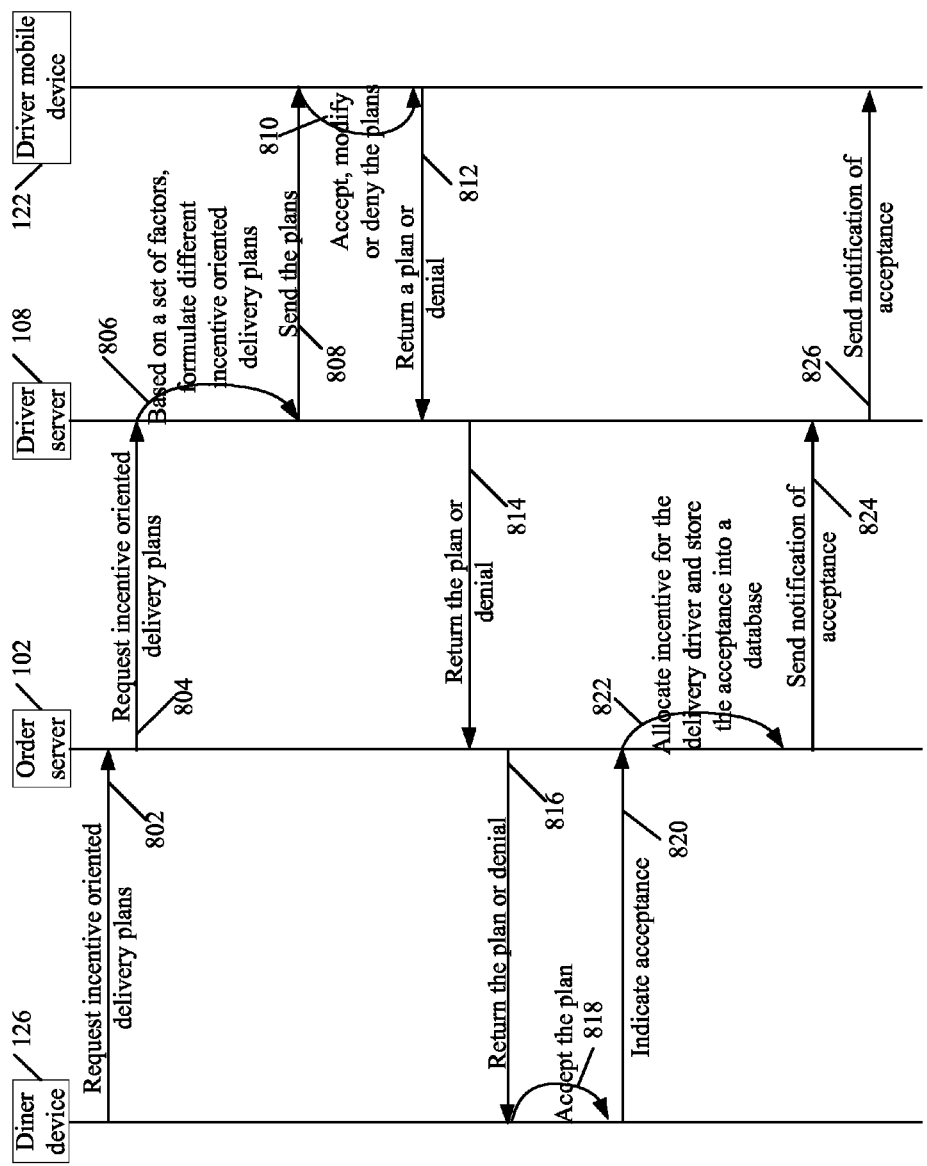
FIG. 8 is sequence diagram depicting a process by which a restaurant service allows a diner to expedite delivery of an order in accordance with the teachings of this disclosure.

Referring now to FIG. 8, a sequence diagram depicting the process of expediting the delivery of an order while the order is out for delivery is shown. At 802, the diner device 126 sends a request for incentive based delivery plans for the order. The order server 102 receives this request and, at 804, sends the request to the driver server 108 over the network 132 or via the database 104. At 806, the driver server, based on a set of factors, formulates different incentive based delivery plans. For example, where the driver 118 is delivering three orders, including the order in question, on a delivery trip, the driver server 108 can stipulate that, if the diner 116 pays an extra five dollars, the driver 118 will deliver her order ahead of the driver's other two orders. Another factor that the driver server 108 can consider is whether the driver 118 can still deliver the other two orders on time under the new delivery plan. Additionally, the driver server 108 can consider other factors, such as traffic patterns, where the driver 118 is in her delivery route, weather conditions, delivery plans for the other two orders, etc. In some cases, the driver server 108 may decide that no incentive based delivery plans can be provided for the diner 116 at a particular time.

Where incentive based delivery plans are available, at 808, the driver server 108 sends the plans to the driver mobile device 122. At 810, the driver 118 decides whether to accept, modify, or reject the new delivery plans. Additionally, at 812, the driver mobile device 122 sends the driver 118's decision regarding the delivery plans to the driver server 108. For example, the driver 118 selects one or more of the incentive based delivery plans. At 814, the driver server 108 returns the decision to the order server 102, which, at 816, forwards the decision to the diner device 126. For example, where the diner 116 selects one incentive based delivery plan, at 818, the diner device 126 accepts the selected delivery plan. Accordingly, at 820, the diner device 126 sends the diner 116's acceptance of the delivery plan to the order server 102. At 822, the order server 102 allocates the incentive for the expedited delivery of the order to the driver 116 and/or other parties, such as the one that hosts the delivery management system 100.

At 822, the order server 102 further saves the change to the order into the database 104. In a further implementation, the change is communicated to the restaurant server 34 which then forwards the change to the restaurant 35 for being displayed on the appliance 36 or the POS 38. Alternatively, the restaurant server 34 retrieves the change from the database 104. At 824, the order server 102 sends a notification of the acceptance of the delivery plan to the driver server 108. Accordingly, at 826, the driver server 108 notifies the driver mobile device 122 of the new delivery plan for the order.

Figure 9:
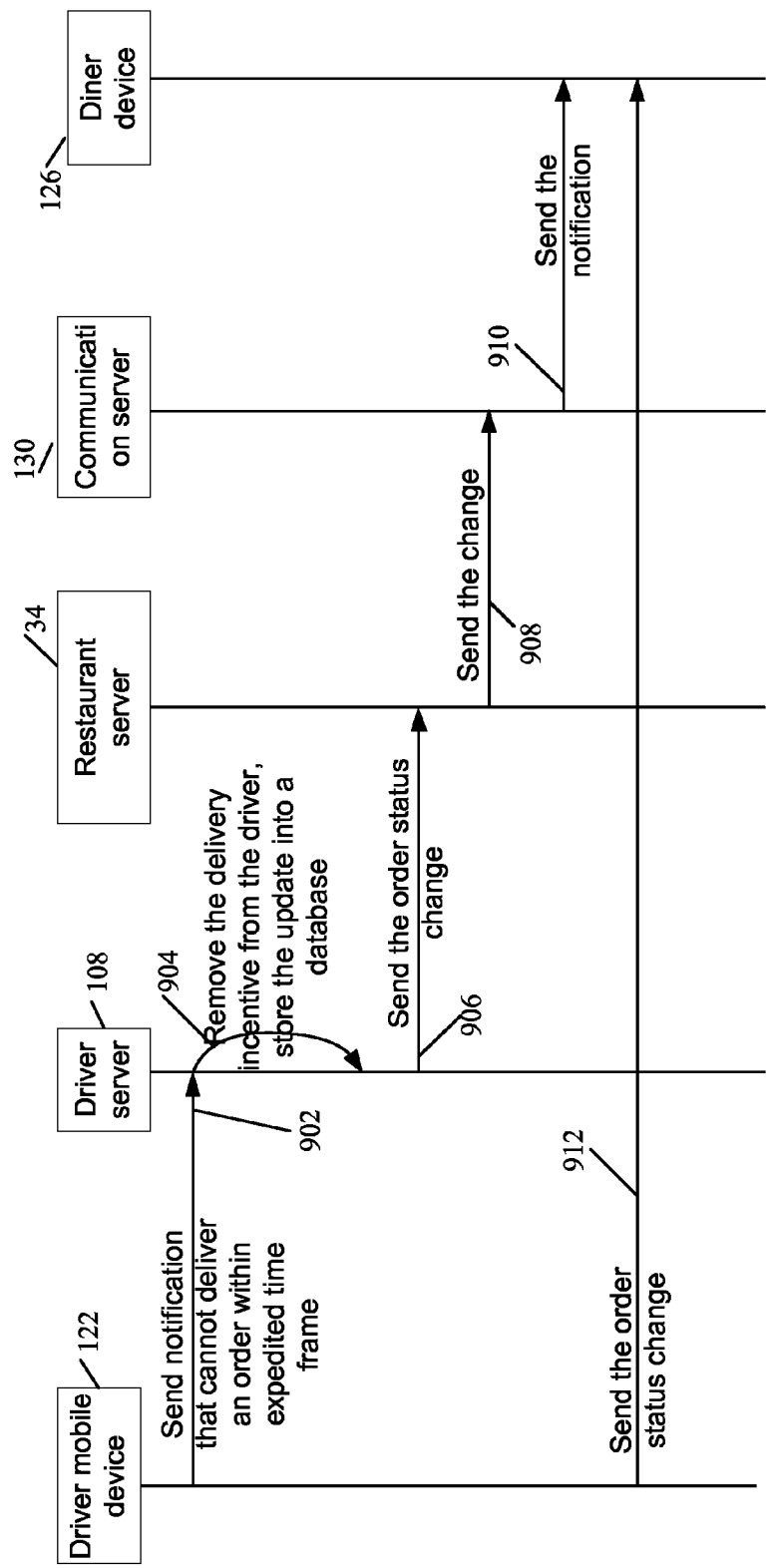
FIG. 9 is sequence diagram depicting a process by which a delivery driver notifies a diner when an order cannot be delivered under an incentive based delivery plan in accordance with the teachings of this disclosure.

Sometimes, due to various reasons, a restaurant and/or delivery driver cannot execute an incentive based delivery plan for an order. In such a case, it is desirable to provide a prompt notification to the diner corresponding to the order. The notification process is further illustrated by reference to FIGS. 9 and 10. Turning first to FIG. 9, where the driver 118 determines that she cannot perform an incentive based delivery while she is driving her delivery route, at 902, she uses the driver mobile device 122 to send a notification that she cannot deliver the order within the expedited time frame to the driver server 108. At 904, the driver server 108 removes the incentive for expedited delivery from the driver 118 and/or the serving restaurant. Additionally, at 904, the driver server 108 may assess a penalty on the driver 118 for failing to deliver the order within the expedited time frame. Furthermore, the driver server 108, at 904, stores the changes to the order into the database 104.

At 906, via either the network 132 or the database 104, the driver server 108 sends the order status change to the restaurant server 34. For example, the driver server 108 writes the order status change to the database 104, and a process running on the restaurant server 34 or the order server 102 retrieves this order status change. In one implementation, the process polls the database 104 for changes. Alternatively, the process receives notifications of changes from the database 104, and then retrieves the changes from the database 104. At 908, the restaurant server 34 or the order server 102 sends the order status change to the communication server 130, which, at 910, sends the order status change to the diner device 126. In a different implementation, the restaurant server 34 or the order server 102 sends the order status change to the diner device 126 directly. Alternatively, at 912, the driver mobile device 122 sends the order status change directly to the diner device 126. The order status change can be sent using an Email message, a text message, a robocall, a push notification, or a proprietary application message.

Figure 10:
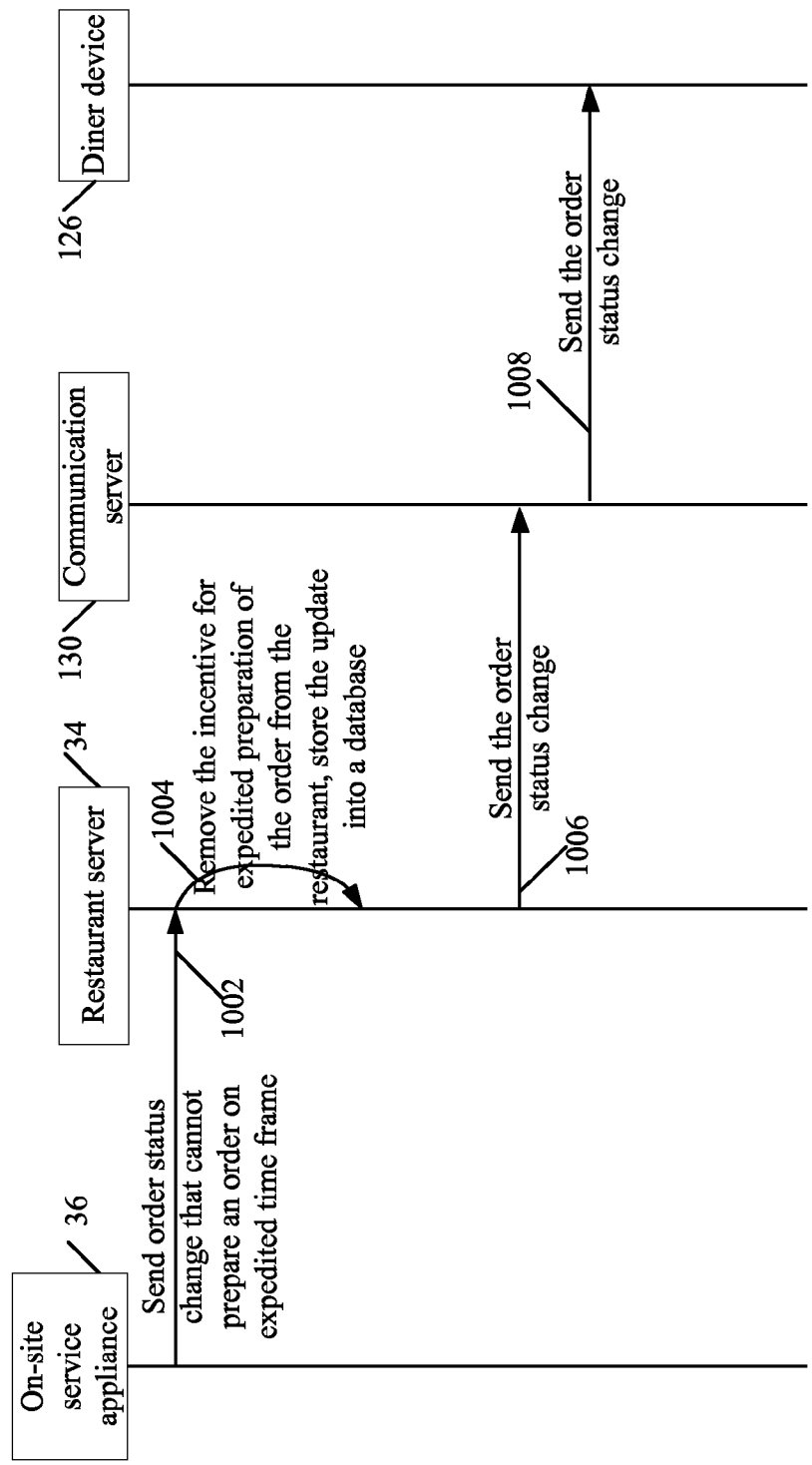
FIG. 10 is sequence diagram depicting a process by which a restaurant notifies a diner when an order cannot be prepared within an expedited time frame in accordance with the teachings of this disclosure.

Turning now to FIG. 10, where the restaurant 35 determines that it cannot fulfill a promise for expedited preparation of an order, at 1002, the appliance 36 sends the order status change to the restaurant server 34. At 1004, the restaurant server 34 removes the incentive for expedited preparation of the order from the restaurant 35. Additionally, at 1004, the restaurant server 34 may assess a penalty on the restaurant 35 for failure to prepare the order within the expedited time frame. Furthermore, at 1004, the restaurant server 34 stores the change into the database 104. At 1006, the restaurant server 34 detects the changed database entry and sends the order status change to the communication server 130. At 1008, the communication server 130 sends the order status change to the diner device 126.

Alternatively, the restaurant server 34 sends the order status change directly to the diner device 126. In a different embodiment, the order server 102 retrieves the order status change from the database 104, and sends, either directly or via the communication server 130, the change to the diner device 126. In a further implementation, the order status change is presented on a web page or sent to a software application running on the diner device 126. The message accompanying the order status change may also indicate any modification, such as reduction or removal, to extra charges for expedited delivery.

Obviously, many additional modifications and variations of the present disclosure are possible in light of the above teachings. Thus, it is to be understood that, within the scope of the appended claims, the disclosure may be practiced otherwise than is specifically described above. For example, the functionality of each server as illustrated herein, such as the driver server 108 or the order server 102, can be performed by more than one physical server.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It is intended that the scope of the disclosure not be limited by the specification, but be defined by the claims set forth below.

What is claimed is:

1. A system for managing incentive based delivery of made-to-order food comprising:
   a database storing menus and menu items and an order;
   an order server including a processor and a network interface operatively coupled to the processor, the order server operatively coupled to the database, the order server communicating with a plurality of diner devices over a wide area network, the plurality of diner devices used by a plurality of diners to access the order server over the wide area network, the plurality of diner devices including a first diner device used by a first diner to submit the order, wherein:
   the order server is adapted to retrieve a set of potential preparation time frames for the order from a restaurant server;
   the restaurant server is adapted to retrieve the set of potential preparation time frames from an on-site appliance housed within a serving restaurant specified by the order, wherein an address of the first diner is distant from an address of the serving restaurant;
   the restaurant server is adapted to cause the on-site appliance to display the order, one or more preparation time frames, and associated additional preparation fees;
   the order server is adapted to retrieve a set of potential delivery time frames for the order from a driver server, where the set of potential delivery time frames from the driver server are dynamically formulated at the driver server and the set of potential delivery time frames are created based on other delivery orders assigned to a mobile device associated with a delivery driver and a current location of the driver in a delivery route and at least one of weather conditions, determined traffic conditions, and delivery plans of the other delivery orders;
   the driver server is adapted to send to and cause to be displayed on the mobile device associated with the delivery driver performing deliveries for the serving restaurant a set of unassigned orders including the order;
   the driver server is adapted to retrieve the set of potential delivery time frames for the order from the mobile device;
   the order server is adapted to dynamically formulate a list of incentive based delivery plans for the order based on the set of potential preparation time frames and the set of potential delivery time frames, wherein the list of incentive based delivery plans comprises a plurality of plans, each of the plurality of plans comprising a distinct time frame indicating potential times for receiving delivery of the order and a distinct value indicating an additional fee to be paid by the first diner in order to receive delivery of the order at the distinct time frame;

the order server is adapted to send the order and the list of incentive based delivery plans to the first diner device over the wide area network;

the first diner device is adapted to receive the list of incentive based delivery plans over the wide area network, and display the list of incentive based delivery plans on a screen;

the first diner device is adapted to allow the first diner to select a particular incentive based delivery plan from the list of incentive based delivery plans for the order; and the first diner device is adapted to send the particular incentive based delivery plan to the order server over the wide area network.

2. The system of claim 1, wherein at least one plan in the list of incentive based delivery plans comprises a penalty, wherein the penalty is assessed against at least one of the serving restaurant or the delivery driver when the order is not delivered before or on the distinct time frame of the at least one plan.

3. The system of claim 1, wherein the list of incentive based delivery plans are formulated after the order is placed.

4. The system of claim 1, wherein the additional fee comprises a first portion allocated for delivery of the order by the delivery driver and a second portion of the additional fee allocated for preparation of the order by the serving restaurant.

5. The system of claim 1, wherein the additional fee of a particular plan in the list of incentive based delivery plans indicates delivery of the order at a time frame associated with the particular plan is at no additional cost.

6. The system of claim 1, wherein the restaurant server retrieves the set of potential preparation time frames from the on-site appliance by:
the restaurant server generating and sending a set of tentative preparation time frames to the on-site appliance housed in the serving restaurant;
the on-site appliance displaying a user interface that presents the set of tentative preparation time frames and provides an option to accept or reject each of the set of tentative preparation time frames;
the on-site appliance receiving a selection to accept or reject each of the set of tentative preparation time frames via the user interface and in response sending a confirmation to the restaurant server.

7. The system of claim 1, wherein the driver server retrieves the set of potential delivery time frames from the mobile device by:
the driver server generating and sending a set of tentative delivery time frames to the mobile device;
the mobile device displaying a user interface that presents the set of tentative delivery time frames and provides an option to accept or reject each of the set of tentative delivery time frames;
the mobile device receiving a selection to accept or reject each of the set of tentative delivery time frames via the user interface and in response sending a confirmation to the restaurant server.

8. The system of claim 1, wherein the restaurant server retrieves the set of potential preparation time frames from the on-site appliance by:
the restaurant server generating and sending a set of tentative preparation time frames to the on-site appliance housed in the serving restaurant;
the on-site appliance displaying a user interface that presents the set of tentative preparation time frames and provides an option to accept or edit each of the set of tentative preparation time frames;
the on-site appliance receiving one or more edits to each of the set of tentative preparation time frames, generating the set of potential preparation time frames based on the one or more edits, and sending the set of potential preparation time frames to the restaurant server.

9. The system of claim 1, wherein the driver server retrieves the set of potential delivery time frames from the mobile device by:
the driver server generating and sending a set of tentative delivery time frames to the mobile device;
the mobile device displaying a user interface that presents the set of tentative delivery time frames and provides an option to accept or edit each of the set of tentative delivery time frames;
the mobile device receiving one or more edits to each of the set of tentative delivery time frames, generating the set of potential preparation time frames based on the one or more edits, and sending the set of potential preparation time frames to the restaurant server.

10. A method for managing incentive based delivery of made-to-order food, the method operating on a diner device and comprising:
the diner device placing an order for food delivery with an order server over a wide area network;
in response to receiving the order, the order server requesting a set of potential preparation time frames from a restaurant server and a set of potential delivery time frames from a driver server, where the set of potential delivery time frames from the driver server are dynamically formulated at the driver server and the set of potential delivery time frames are created based on other delivery orders assigned to a mobile device associated with a delivery driver and a current location of the driver in a delivery route and at least one of weather conditions, determined traffic conditions, and delivery plans of the other delivery orders, wherein the restaurant server causes the order, one or more preparation time frames, associated additional preparation fees, and set of potential delivery time frames to be displayed on an on-site appliance housed within a serving restaurant specified by the order and retrieves the set of potential delivery time frames from the on-site appliance and the driver server causes a set of unassigned orders including the order to be displayed on the mobile device of a delivery driver for the serving restaurant and retrieves the set of potential delivery time frames from the mobile device;
the order server dynamically generating a list of incentive based delivery plans in response to receiving the set of potential preparation time frames and the set of potential delivery time frames, wherein the list of incentive based delivery plans comprises a plurality of plans, each of the plurality of plans comprising of a distinct time frame indicating potential times for receiving delivery of the order and a distinct value indicating an additional fee to be paid in order to receive delivery of the order at the distinct time frame, wherein an address of a diner using the diner device is distant from an address of the serving restaurant;

the order server sending the list of incentive based delivery plans to the diner device over the wide area network;

the diner device receiving the list of incentive based delivery plans for the order from the order server over the wide area network;

the diner device displaying the list of incentive based delivery plans on a screen of the diner device;

the diner device receiving user input selecting a particular incentive based delivery plan from the list of incentive based delivery plans for the order; and the diner device sending the particular incentive based delivery plan to the order server over the wide area network.

11. The method of claim 10 wherein at least one plan in the list of incentive based delivery plans comprises a penalty wherein the penalty is assessed against at least one of the serving restaurant or the delivery driver when the order is not delivered before or at the distinct time frame of the at least one plan.

12. The method of claim 10, wherein the additional fee comprises a first portion designated for delivery of the order by the delivery driver and a second portion of the additional fee is designated for preparation of the order by the serving restaurant of the order.

13. The method of claim 10, wherein the additional fee of a particular plan in the list of incentive based delivery plans indicates delivery of the order at a time frame associated with the particular plan is at no additional cost.

14. The method of claim 10, wherein the list of incentive based delivery plans are formulated after the order is placed.

15. The method of claim 10, wherein the restaurant server retrieves the set of potential preparation time frames from the on-site appliance by:

the restaurant server generating and sending a set of tentative preparation time frames to the on-site appliance housed in the serving restaurant;

the on-site appliance displaying a user interface that presents the set of tentative preparation time frames and provides an option to accept or reject each of the set of tentative preparation time frames;

the on-site appliance receiving a selection to accept or reject each of the set of tentative preparation time frames via the user interface and in response sending a confirmation to the restaurant server.

16. The method of claim 10, wherein the driver server retrieves the set of potential delivery time frames from the mobile device by:

the driver server generating and sending a set of tentative delivery time frames to the mobile device;

the mobile device displaying a user interface that presents the set of tentative delivery time frames and provides an option to accept or reject each of the set of tentative delivery time frames;

the mobile device receiving a selection to accept or reject each of the set of tentative delivery time frames via the user interface and in response sending a confirmation to the restaurant server.

17. The method of claim 10, wherein the restaurant server retrieves the set of potential preparation time frames from the on-site appliance by:

the restaurant server generating and sending a set of tentative preparation time frames to the on-site appliance housed in the serving restaurant;

the on-site appliance displaying a user interface that presents the set of tentative preparation time frames and provides an option to accept or edit each of the tentative preparation time frames;

the on-site appliance receiving one or more edits to each of the set of tentative preparation time frames, generating the set of potential preparation time frames based on the one or more edits, and sending the set of potential preparation time frames to the restaurant server.

18. The method of claim 10, wherein the driver server retrieves the set of potential delivery time frames from the mobile device by:

the driver server generating and sending a set of tentative delivery time frames to the mobile device;

the mobile device displaying a user interface that presents the set of tentative delivery time frames and provides an option to accept or edit each of the set of tentative delivery time frames;

the on-site appliance receiving one or more edits to each of the set of tentative delivery time frames, generating the set of potential preparation time frames based on the one or more edits, and sending the set of potential preparation time frames to the restaurant server.

19. A non-transitory computer-readable storage medium storing one or more instructions which, when executed by one or more processors, cause the one or more processors to perform steps comprising:

a diner device placing an order for food delivery with a first server over a wide area network;

in response to receiving the order, the first server requesting a set of potential preparation time frames from a restaurant server and a set of potential delivery time frames from a driver server, wherein the restaurant server retrieves the set of potential preparation time frames from an on-site appliance housed within a serving restaurant specified by the order and the driver server retrieves the set of potential delivery time frames from a mobile device of a delivery driver for the serving restaurant;

wherein the restaurant server is adapted to cause the on-site appliance to display the order, one or more preparation time frames, and associated additional preparation fees;

wherein the driver server is adapted to send to and cause to be displayed on a mobile device associated with the delivery driver for the serving restaurant;

wherein the set of potential delivery time frames from a mobile device of a delivery driver for the serving restaurant are dynamically formulated at the driver server and the set of potential delivery time frames are created based on other delivery orders assigned to the mobile device associated with a delivery driver and a current location of the driver in a delivery route and at least one of weather conditions, determined traffic conditions, and delivery plans of the other delivery orders;

the first server dynamically generating a list of incentive based delivery plans in response to receiving the set of potential preparation time frames and the set of potential delivery time frames, wherein the list of incentive based delivery plans comprises a plurality of distinct time frames indicating potential times for receiving delivery of the order and each particular time frame of the plurality of distinct time frames is associated with a distinct value indicating an additional fee to be paid in order to receive delivery of the order at the particular time frame, wherein an address of a diner using the diner device is distant from an address of the serving restaurant;

the first server sending the list of incentive based delivery plans to the diner device over the wide area network;

the diner device receiving the list of incentive based delivery plans for the order from the first server over the wide area network;

the diner device displaying the list of incentive based delivery plans on a screen of the diner device;

the diner device receiving user input selecting a particular incentive based delivery plan from the list of incentive based delivery plans; and the diner device sending the particular incentive based delivery plan to the first server over the wide area network.

20. The system of claim 1, wherein the set of potential preparation time frames includes a base preparation time frame, the base preparation time frame has a zero additional fee, and the set of potential preparation time frames additionally can include at least one expedited preparation time frame, the at least one expedited preparation time frame comes earlier chronologically than the base preparation time frame, and each of the at least one expedited preparation time frame has an associated non-zero additional fee.

21. The system of claim 1, wherein the set of potential delivery time frames includes a base delivery time frame, the base delivery time frame has a zero additional fee, and the set of potential delivery time frames can include at least one expedited delivery time frame, the at least one expedited delivery time frame comes earlier chronologically than the base delivery time frame, each of the at least one expedited delivery time frame has an associated non-zero additional fee.

22. The system of claim 8, wherein the set of potential preparation time frames includes a base preparation time frame, the base preparation time frame has a zero additional fee and additionally the set of potential preparation time frames can also include at least one expedited preparation time frame, the at least one expedited preparation time frame comes earlier chronologically than the base preparation time frame, and each of the at least one expedited preparation time frame has an associated non-zero additional fee.

23. The system of claim 8, wherein the set of potential delivery time frames includes a base delivery time frame, the base delivery time frame has a zero additional fee, and additionally the set of potential delivery time frames can include at least one expedited delivery time frame, the at least one expedited delivery time frame comes earlier chronologically than the base delivery time frame, each of the at least one expedited delivery time frame has an associated non-zero additional fee.

24. The non-transitory computer-readable storage medium of claim 19, wherein the set of potential preparation time frames includes a base preparation time frame, the base preparation time frame has a zero additional fee, and additionally the set of potential preparation time frames can also include at least one expedited preparation time frame, the at least one expedited preparation time frame comes earlier chronologically than the base preparation time frame, and each of the at least one expedited preparation time frame has an associated non-zero additional fee.

25. The non-transitory computer-readable storage medium of claim 19, wherein the set of potential delivery time frames includes a base delivery time frame, the base delivery time frame has a zero additional fee, and additionally the set of potential delivery time frames can also include at least one expedited delivery time frame, the at least one expedited delivery time frame comes earlier chronologically than the base delivery time frame, each of the at least one expedited delivery time frame has an associated non-zero additional fee.

* * * * *